(12) United States Patent
Olschewski

(10) Patent No.: US 6,721,690 B2
(45) Date of Patent: Apr. 13, 2004

(54) MICROSCOPE AND METHOD FOR ANALYZING ACQUIRED SCAN DATA

(75) Inventor: Frank Olschewski, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 275 days.

(21) Appl. No.: 09/681,051

(22) Filed: Dec. 10, 2000

(65) Prior Publication Data

US 2002/0027193 A1 Mar. 7, 2002

Related U.S. Application Data
(60) Provisional application No. 60/170,243, filed on Dec. 10, 1999.

(51) Int. Cl.⁷ .................................................. G06F 3/00
(52) U.S. Cl. .................. 702/189; 702/181; 702/183; 702/188
(58) Field of Search .............. 702/57, 66, 67, 702/69, 71–74, 93, 111, 124, 181, 183, 188, 189; 356/456; 600/407

(56) References Cited

U.S. PATENT DOCUMENTS

| | | | | |
|---|---|---|---|---|
| 5,283,433 A | | 2/1994 | Tsien | 250/234 |
| 5,561,611 A | * | 10/1996 | Avinash | 364/553 |
| 6,339,217 B1 | * | 1/2002 | Kley | 250/216 |
| 6,376,843 B1 | * | 4/2002 | Palo | 250/458.1 |
| 6,381,555 B1 | * | 4/2002 | Sewell | 702/181 |
| 6,387,707 B1 | * | 5/2002 | Seul et al. | 436/164 |

FOREIGN PATENT DOCUMENTS

EP  0 592 089 B1  7/1998  ........... G02B/21/00

OTHER PUBLICATIONS

Olschewski, von F., "*Phasenvisualisierung als Alternative zu Ratiometrischen Verfahren zur Bestimmung Intrazellularer Analyte–Konzentrationen in der Fluoreszenzmikroskopie (Fortsetzung)*", XP–002217374, pp. 49–72.

* cited by examiner

*Primary Examiner*—Marc S. Hoff
*Assistant Examiner*—Felix Suarez
(74) *Attorney, Agent, or Firm*—Houston Eliseeva LLP

(57) ABSTRACT

A method and system for analyzing acquired scan data are disclosed. The method involves measuring physical values of a particular process, converting the measured values into two signals, such as electrical signals, and then converting the two signals into polar coordinates by defining a vector having a radial magnitude and a vector angle corresponding to the magnitudes of the two signals. The method further provides for validation and visual representation of the measured physical values by employing the angle information to define the upper and lower bounds of the acceptable measured values. The corresponding system comprises sensors measuring the two physical values and yielding the two signals. A signal processing unit receives the two signals, converts them into a pair of polar coordinates defines by the magnitude of the two signals.

19 Claims, 7 Drawing Sheets

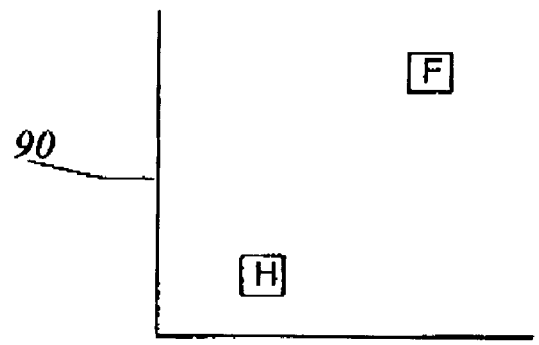
Fig. 9a
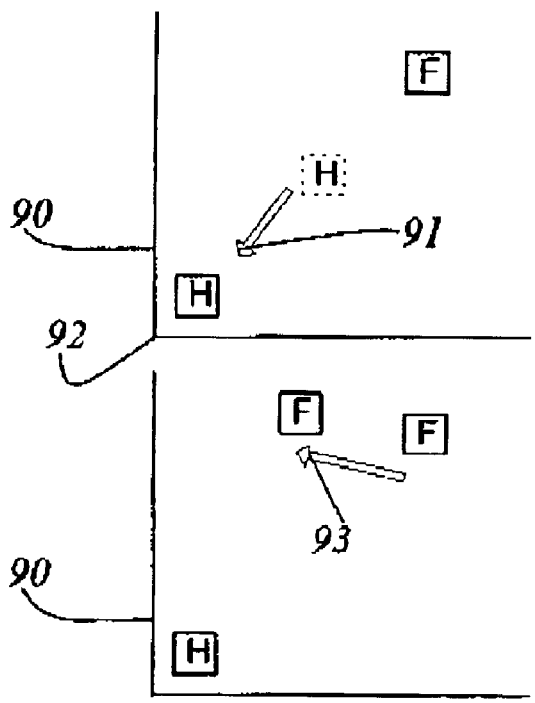
Fig. 9b
Fig. 9c
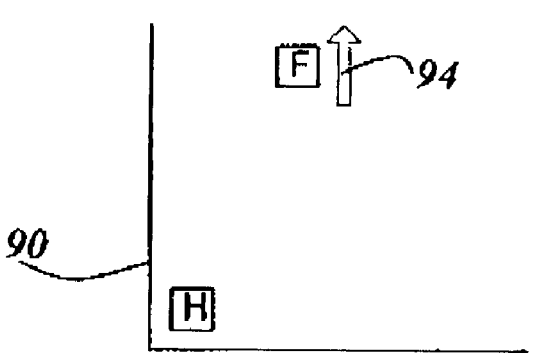
Fig. 9d

MICROSCOPE AND METHOD FOR ANALYZING ACQUIRED SCAN DATA

CROSS REFERENCE TO RELATED APPLICATIONS

This application claims priority from U.S. provisional application Ser. No. 60/170,243 filed Dec. 10, 1999, which provisional application is incorporated herein by reference.

BACKGROUND OF INVENTION

The present invention relates to a method and apparatus for analyzing acquired scan data, and to a scanning fluorescence microscope implementing a method for analyzing acquired scan data. More particularly, the invention relates to a method for acquiring and processing signals of a process which are not directly observable because of the multiplicative superposition of a global interference signal.

In microscopy (cf. C. R. Bright et al., Methods in Cell Biology; Vol. 30, pages 157 to 192, Academic Press Inc.) and cytofluorometry, two identically interfered signals, from which a conclusion as to the desired signal must be drawn, are acquired. During the observation of physiological processes, the physiological and phototoxic processes are superimposed. Similar situations happen in optical measurements using the kind of illumination in which the noise of the light source falsifies the object measurement, or in multispectral image processing, where individual features can be emphasized by reducing multiplicative influences (cf. Jain (1989): "Fundamentals of Digital Image Processing," London, Prentice-Hall).

Many processes cannot be observed directly. This is true in particular of processes on which a global interference signal is multiplicatively superimposed. The procedure according to the existing art is to acquirewhenever physically possible two signals $I_1$ (t) and $I_2$ (t) (represented here as time signals). S(t) is the interference signal, F(I(t)) is the detector signal having a first wavelength, and G(I(t)) is the detector signal that derives from a second wavelength.

$$I_1(t) = S(t)F(I(t))$$

$$I_2(t) = S(t)G(I(t))$$

Creating a ratio $$r = \frac{I_1}{I_2} = \frac{F(I)}{G(I)} = H(I)$$

which ratio provides more characteristic information about the I than in other cases which cannot be accurately observed. The effect of noise (noise, offsets) is ignored in the case of the two acquired signals $I_1$ (t) and $I_2$ (t). Ignoring the noise results in an additional additive noise term for r, which is ignored here. This type of procedure is existing art, e.g. is utilized in European Patent EP-B-0 592 089, and will be referred to hereinafter as "ratiometric measurement."

SUMMARY OF THE INVENTION

It is the object of the invention to provide an apparatus which performs an adapted coding of signal pairs.

A further object of the invention is to provide a method implementing an adapted coding of signal pairs.

The configuration according to the present invention provides an advantage that in the context of the transformation, a separation is performed between the usable signal and the interference signal. This considerably simplifies the configuration of the apparatus, resulting in lower manufacturing costs. What is significant in this context is that after the transformation, only scalar variables are processed. The transformation maps the original two-dimensional signal space onto a compact region in a one-dimensional signal space, thereby achieving particular compactness. Because of this property, the usable signal can be coded and memory space is efficiently economized.

Even if the above-described functionality is confined to the ratiometric information, the system of the present invention performs much better than that with purely ratiometric approaches. The polar coordinate transformation maps the relevant measured data onto a particular angle in compact fashion, taking into account the degrees of freedom of the process. Methods based on divisions do not offer this compact transformation or the compression property (linear, in the transformation space) associated therewith.

It should also be noted that the transformation into polar coordinates technically does not necessarily require a division (neural networks, COORDIC algorithms, lookup tables), and represents much more of the underlying mathematical operation than is disclosed in EP-B-0 592 089.

BRIEF DESCRIPTION OF DRAWINGS

The measurement device that is the subject matter of the invention is depicted in the drawings and will be described hereinafter with reference to the Figures, in which:

FIGS. 9a to 9h show a graphic depiction of the calibration procedure for determining the polygon.

DETAILED DESCRIPTION

Figure 1:
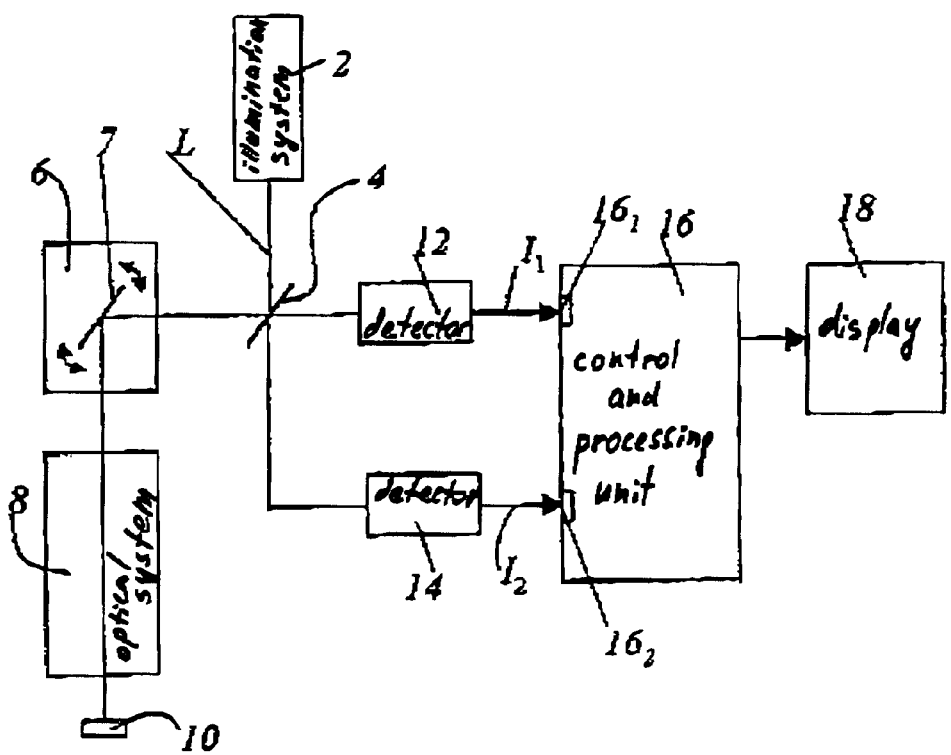
FIG. 1 shows a schematic view of the apparatus according to the present invention in conjunction with a fluorescence microscope.

FIG. 1 shows a schematic illustration of a system having a confocal microscope. It is clear that the present invention also applies to conventional fluorescence microscopes or any other application which detects, with two detectors, signals that differ in wavelength. The description in conjunction with a confocal microscope is not regarded as a limitation. The microscope comprises an illumination system 2 that generates a light beam L. Incident light beam L is directed by an optical device 4 to a scanning device 6. Scanning device 6 comprises a scanning mirror system 7, which is moveable such that light beam L is scanned across a specimen 10. Before light beam L reaches specimen 10, the light passes through an optical system 8. The light reflected from the specimen and the fluorescent light each travel along beam path L back to optical device 4. Positioned after optical device 4 are a first and a second detector 12 and 14, each of which receives light of different wavelengths. Detectors 12 and 14 convert the received light into a first and second electrical signal $I_1$ and $I_2$ respectively, which is proportional to the power of the light received from the specimen. First electrical signal $I_1$ is fed to a first input port 16₁. Second electrical signal $I_2$ is fed to a second input port 16₁. First input port 16₁ and second input port 16₂ are part of a control and processing unit 16. Finally, the output from control and processing unit 16 is sent to a display unit 18 which provides, besides other data in visual form, visual user guidance. Control and processing unit 16 is realized with a plurality of FPGA (field programmable gate array) units. To achieve online processing of scan signals, it is advantageous to digitize the analog signals I and P as soon as possible and to process the data with a programmable digital logic system. The advantage of FPGA electronics is absolute real-time processing, which allows a nanosecond accuracy.

Figure 2:
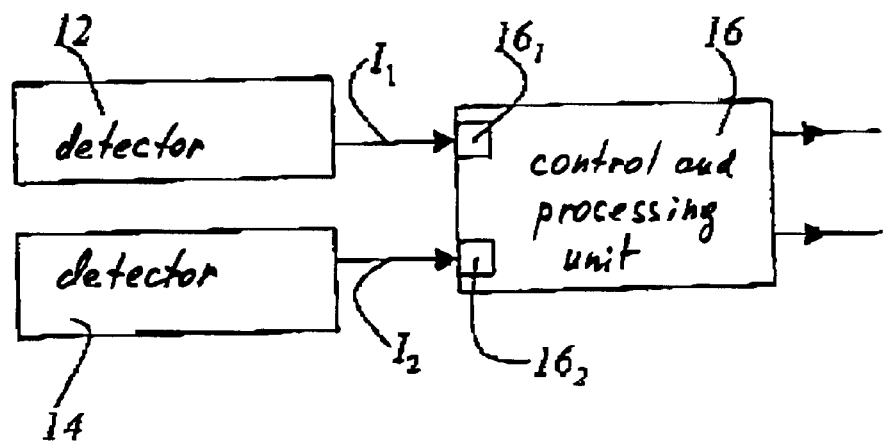
FIG. 2 shows a schematic depiction of the apparatus for carrying out the method according to the present invention.

FIG. 2 depicts, in enlarged fashion, the unit made up of the two detectors 12 and 14 together with the processing electronics. This represents acquisition and coding on the basis of a multivariate detector model. The first and second detectors respectively receive first and second signals $I_1$ and $I_2$ First and second signals $I_1$ and $I_2$ arrive via corresponding electrical connections in control and processing unit 16, which is configured as a polar coordinate quantizer. Each two of the values received by the various detectors 12 and 14 can be combined into a vector. First signal $I_1$ is conveyed to a first input port 16 and second signal $I_2$ is conveyed to a second input port 16₂ Vector I is shown in Equation 1.

$$\vec{I} = \begin{pmatrix} I_1 \\ I_2 \end{pmatrix} \quad \text{(Equation 1)}$$

Equation 2 shows the ratio as a function of a vector that results from dividing first signal $I_1$ by second signal $I_2$.

$$r(\vec{I}) = \frac{I_1}{I_2} \quad \text{(Equation 2)}$$

It is apparent that all the r(I)=const in the $I_1$–$I_2$ diagram (of the type shown in FIG. 3) define a straight line g(r): $s_{1\,2}r$. Each process that brings about a change in the ratio r must be associated with a change in the first and second signals equivalent to $$\Delta \vec{I} = \begin{pmatrix} \Delta I_1 \\ \Delta I_2 \end{pmatrix} \quad \text{(Equation 3)}$$

in which $\Delta I_1$ and $\Delta I_2$ represent the changes in the first and second signals $I_1$, $I_2$, respectively. This change $\Delta I$ can be separated into two perpendicular components: in a direction parallel to g, no change in the ratio can occur; in a direction perpendicular to the straight line g (corresponding to $\nabla$ r), a maximal change in the ratio occurs. Since this applies equally to all points, it is an obvious step to expand into polar coordinates as shown in Equation 4, in which R indicates the radius and φ-the angle for representing the first and second signals $I_1$ and $I_2$ in polar coordinates:

$$\begin{pmatrix} R \\ \varphi \end{pmatrix} = \begin{pmatrix} \sqrt{I_1^2 + I_2^2} \\ \arctan\left(\frac{I_1}{I_2}\right) \end{pmatrix} = \begin{pmatrix} R \\ \arctan(r) \end{pmatrix} \quad \text{(Equation 4)}$$

As is evident from Equation 4, only angle φ contains the relevant information. In a scanning microscope (e.g. in a confocal microscope), the signals $I_1$ and $I_2$ obtained from first and second detectors 12 and 14 are necessarily discrete. In the simple case in which both variables are quantized in identical fashion in Q steps, the result is $Q^2$ distinguishable steps for the ratio signal. If identical probabilities are assigned to these steps, the number of bits shown in Equation 5 is needed in order to code the ratio.

$$B_{ratio} = ld(Q^2) \text{ bits} = 2ld(Q) \text{ bits} \quad \text{(Equation 5)}$$

This corresponds to a doubling of the memory space as compared to the two acquired variables (first and second signals $I_1$ and $I_2$). Coding of the angle φ is determined by the number of vectors/that can be resolved on a circle of radius R for an angle φ from 0° to 90°. Assuming that R: $0 < R \leq \sqrt{2}$ Q is constant, an upper limit the number of states can be indicated on the discrete space for each radius. This upper limit is defined by the length of the circular segment in Equation 6:

$$Q_R = \frac{\pi R}{2} \quad \text{(Equation 6)}$$

$Q_R$ is an upper bound for this value. This is an overestimate of states along oblique sections. This property is typical of discrete topologies. The maximum for this upper limit $Q_{R\,limit}$ is obtained, for R=r$\sqrt{2}$ Q, from Equation 7:

$$Q_{R,limit} = \frac{\pi \sqrt{2}\, q}{2} \quad \text{(Equation 7)}$$

Coding the states of this path (assuming an equal probability for all states) then requires a quantity $B_R$ of bit states (Equation 8):

$$B_R = ld(Q_{R,limit}) \text{bits} = ld\left(\frac{\pi \sqrt{2}\, Q}{2}\right) \text{bits} \quad \text{(Equation 8)}$$

$$= \left[ ld\left(\frac{\pi \sqrt{2}}{2}\right) + ld(Q) \right] \text{bits}$$

$$= [ldQ + 1.15] \text{bits}$$

This can be used directly for coding, and is approximately one bit more than for the acquired data; note that this form of coding is nonlinear.

Looking further at small signal changes around the working point/, the change in the ratio r is then obtained from Equation 9:

$$\Delta r \approx \nabla r(\vec{I}) \Delta \vec{I} = \frac{1}{I_2} \Delta I_1 - \frac{I_1}{(I_2)^2} \Delta I_2 \quad \text{(Equation 9)}$$

The resolution of a small signal around the working point therefore depends on the position of the working point I: the working point I has a controlling influence on the measurement. The resolution is higher for large detected values than for small values, the deciding factor being the particular radius on which the working point I lies. For this reason, the coding indicated above (Equation 8) is rather conservative.

Practical example: Fluorescence Microscopy.

In fluorescence microscopy, the influence of the working point I is unpredictable, and is superimposed on a trend over time toward lower values due to phototoxic effects (e.g. bleaching). The purpose of determining a ratio between the first and second signals $I_1$ and $I_2$ is precisely to eliminate these time-related influences, which cannot be done completely because of the influence of the working point I. In practice, every measurement extending over a period of time suffers from a loss of resolution over time. The resolution defined by the ratio is therefore only a theoretical magnitude, and cannot be achieved in practice. An obvious choice here is to work with an expected (in the statistical sense) working point. If the input variables (first and second signals $I_1$ and $I_2$) are equally distributed, the result is the condition depicted in Equation 10:

$$E[\vec{I}] = E\left[\begin{pmatrix} I_1 \\ I_2 \end{pmatrix}\right] = \frac{1}{2}\begin{pmatrix} Q \\ Q \end{pmatrix} = \begin{pmatrix} Q_{Expected} \\ Q_{Expected} \end{pmatrix} \qquad \text{(Equation 10)}$$

Coding the states (assuming an equal probability for all states) then requires a quantity $B_R$ of bit states (Equation 11):

$$\begin{aligned}
B_R &= ld(Q_{R,Expected}) \text{bits} \qquad \text{(Equation 11)}\\
&= ld\left(\frac{\pi\sqrt{2}\, Q_{Expected}}{2}\right) \text{bits}\\
&= \left[ld\left(\frac{\pi\sqrt{2}}{4}\right) + ld(Q)\right] \text{bits}\\
&= [ldQ\mathrel{+}= 0.15] \text{bits}.
\end{aligned}$$

This can be coded with approximately the same memory depth as for the two original signals.

The method necessary for implementation of the above-described coding uses substantially the system depicted in FIG. 2. First and second detectors 12 and 14 and control and processing unit 16 can easily be incorporated into the structure of existing units, for example into confocal or other scanning optical microscopes (cf. FIG. 1). Control and processing unit 16 is configured in the form of a polar coordinate quantizer. The polar coordinate quantizer can be implemented or configured in several ways.

One possibility is to perform the requisite processing of the data using analog electronics. First and second detectors 12 and 14 supply first and second detector signals $I_1$ and $I_2$. Detector signals $I_1$ and $I_2$ are converted into the polar coordinates by way of an analog circuit, and then the polar coordinates are quantized. This method is laborious but, in principle, possible.

Another possibility is to use digital circuits. Quantization of first and second signals $I_1$ and $I_2$ by first and second detectors 12 and 14, and processing, occur in the digital realm. Some possibilities for doing so include field programmable gate arrays (FPGA), personal computers (PC), or digital signal processors (DSP). This usually allows for more economical implementation. Additional possible configurations are 2D lookup tables; COORDIC algorithms (FPGA or PC); direct calculation using division, adders and multipliers, and lookup tables; and approximation via a digital neural network.

Signal separation (physiological and non-physiological).

The separation of physiological signals from non-physiological interference can also be applied here. The formulas presented in the documentation of C. R. Bright et al., Methods in Cell Biology, Vol. 30, pages 157 to 192, Academic Press Inc., for the calibration of physiological signals are all based on titration experiments. The in vitro calibration using $Ca^{2+}$ ions is reproduced by Equation 12, the pH value by Equation 13, and cAMP by Equation 14:

$$[Ca^{2+}] = Kr - \frac{r_{min}}{r_{max} - r}, \qquad \text{(Equation 12)}$$

$$[pH] \sim \log r - \frac{r_{min}}{r_{max} - r} \qquad \text{(Equation 13)}$$

$$[cAMP] = K\left(\frac{r - r_{min}}{r_{max} - r}\right)^{\frac{1}{n}} \qquad \text{(Equation 14)}$$

in which $r_{min}$ is the measured ratio without calcium ions and $r_{max}$ the measured ratio with the maximum concentration of calcium ions. All the underlying processes are delimited by one $r_{min}$ and one $r_{max}$. When measuring $r_{min}$ and $r_{max}$ with fluorescent dyes, consideration must also be given to unbound and saturation states, meaning that in one case a maximum first signal $I_1$ is received and in the other case a maximum second signal $I_2$ is received. These values must necessarily be measured with the same detectors, and are absolute operating limits. In $I_1$–$I_2$ diagram 24 (cf. FIG. 3), this information can be used to define a working region (in this case ignoring any background fluorescence, which essentially causes a displacement of the origin), within which a physiological signal must remain. White region 20 marked in $I_1$–$I_2$ diagram 24 is referred to as the "permitted region." Region 22 marked with crosshatching is not physiological in origin, and is not utilized for measurement. Any measurement point that is received in the gray region is unequivocally a measurement error. This can be used to validate the measurement results (e.g. by coloring points in the image red). In addition, this delimitation could also be used to reduce memory even further (although this is not discussed further here). The oblique operating boundaries can advantageously be verified in the transformation space that is described (boundary angles), and saturation intensities can be verified in the non-transformed space. Here again, an implementation in analog electronics, digital electronics, or software is possible. The segmented signal can be visualized directly; in an image, for example, all physiological components can be coded green, and all invalid components red.

Figure 3:
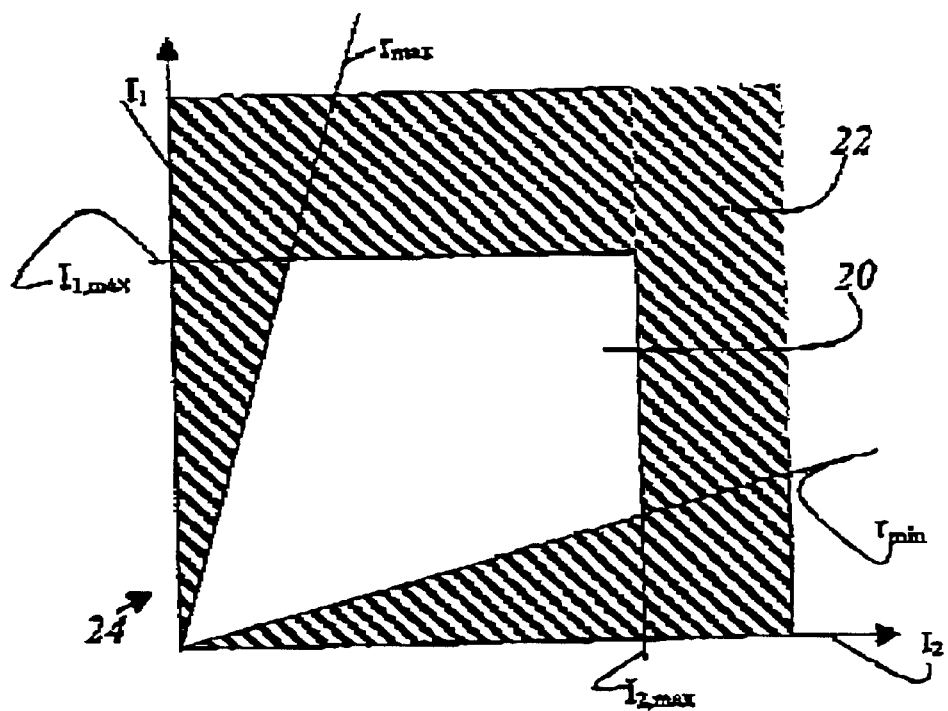
FIG. 3 shows the structure of the $I_1$ $I_2$ space and the delimitation of the working area using physiological models and the property of fluorescent dyes.
Figure 4:
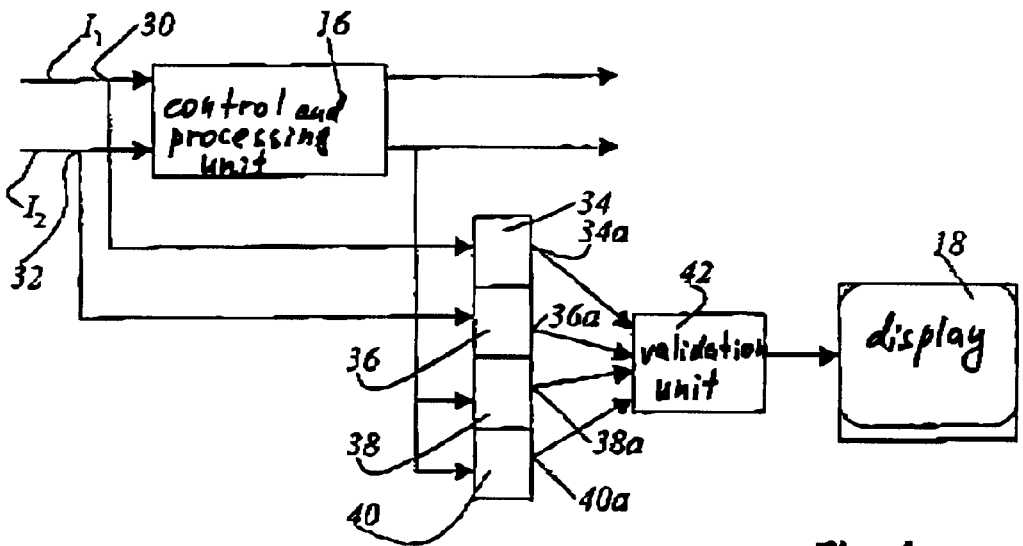
FIG. 4 shows a schematic configuration for segmentation into physiological and non-physiological signal components.

Calibration and validation of physiological phenomena: White region 20 depicted in FIG. 3 is the aforementioned working region, which is of high quality when it has the greatest possible opening angle and the largest possible surface area in $I_1$–$I_2$ diagram 24. This quality criterion can easily be verified, and is particularly favorable for use in an automated system adjustment method. One example is the definition of the external corner points while at the same time displaying the $I_1$–$I_2$ plane in a derived form. FIG. 4 shows a configuration that is suitable for visualizing the aforementioned criteria. First and second signals $I_1$ and $I_2$ are delivered to control and processing unit 16. Also provided upstream from control and processing unit 16 are a first and a second branching point 30 and 32, which feed first and second signals $I_1$–$I_2$ and to first and second comparison elements 34 and 36, respectively. Angle coordinate φ of the polar coordinate of the particular measurement point is similarly fed to a third comparison element 38, which defines the lower limits of angle coordinate φ. Angle coordinate φ is additionally fed to a fourth comparison element 40, which defines the upper limits of angle coordinate φ.

Each of the comparison elements has an output, such as 34a, 36b, 38a, and 40a, through which the signals are sent to a validation unit 42. The corresponding signals are sent from validation unit 42 out to display 18, and presented to the user in the visual form.

Figure 5:
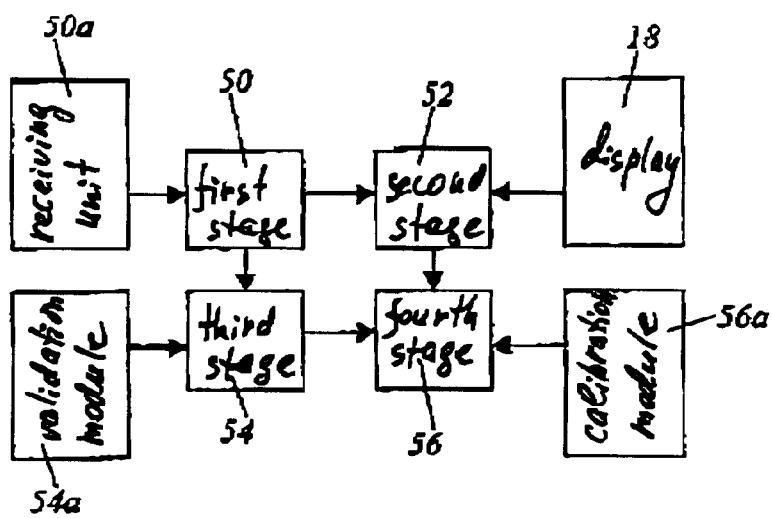
FIG. 5 shows a schematic depiction of the invention illustrating the various subprocesses together.

FIG. 5 shows a schematic depiction of the invention which illustrates the correlation among the individual subprocesses. The data to be processed are sent to a first stage 50. The data are derived, for example, from a corresponding receiving unit 50a. As described above, the data contain a particular coding of the amplitudes of signal pairs. This consists in a transformation of the amplitude vectors followed by quantization (see description of FIG. 2). The result of the transformation is to separate the usable signal and interference signal. The transformation simplifies the system design and results in lower manufacturing costs, since after the transformation usually only a scalar variable needs to be processed. The transformation maps the original two-dimensional signal space onto a compact region in a one-dimensional signal space (compactness). As a result of this property, the usable signal can be coded and memory can be efficiently economized. The resolution of the transformed, coded signal pair corresponds exactly to the degrees of freedom of the generating process. Virtual but unachievable resolutions, which characterize other methods, are thus avoided.

The data, transformed in first stage 50, are fed to a second stage 52. Because of the coding described with regard to first stage 50, the acquired image data are directly accessible to visualization. The data can be presented directly on display 18. An amplitude vector can distinguish 65,536 states with currently standard 8-bit wide A/D converters, and 16,777,216 states at 12 bits. Human perception, however, is limited to about 200 colors and 500 brightness levels (see Mallot, "Sehen und die Verarbeitung visueller Information" [Vision and the processing of visual information], pages 108–109, Braunschweig, Vieweg, 1998). The coding defined in first stage 50 greatly decreases the number of stages, and reduces the visualization to the essential information. The technical and human components are adapted to one another. The coded visualization is optimal in the sense that very small changes are mapped onto color changes that are just perceptible (optimization in terms of perceptual theory). At small signal amplitudes, coloring using a conventional 8-bit lookup coloring table is possible. At large signal amplitudes, pseudocoloring (see Lehmann, "Bildverarbeitung für die Medizin" [Image processing for medicine], pages 356–358) can still be used. There is no need for parameterization of the system by the user for specific selection of the information to be displayed. The entire system is easier to handle with improved ergonomics.

In a third stage 54, the biophysical models of physiological processes are linked to the data of the multivariate detector model from first stage 50. This allows plausibility to be verified based on the acquired signals. The signal pair is segmented into a physiological and a non-physiological component. The details are described above in the section entitled "Signal separation (physiological and non-physiological)." This approach can be used to reduce human error during an experimental run, and serves to validate the experiments that have already been performed. The data necessary for validation are obtained in a validation module 54a that is connected to third stage 54.

The data obtained and ascertained in the second and third stages 52 and 54 are fed to a fourth stage 56. Calibration is then performed in fourth stage 56 using a calibration module 56a. The physiological data obtained in third stage 56 can be checked during execution, and concurrently visualized in second stage 54. This approach eliminates operating uncertainties, and reduces human error during an experimental run, providing a user of the microscope with a guide. A further effect is to improve ergonomics and working effectiveness. An automation unit acts on the fourth stage. The method can be optimally incorporated into the system design by way of computer-aided help functions. This results in direct guidance of the user by software. The necessary settings can be automated relatively easily.

Figure 6:
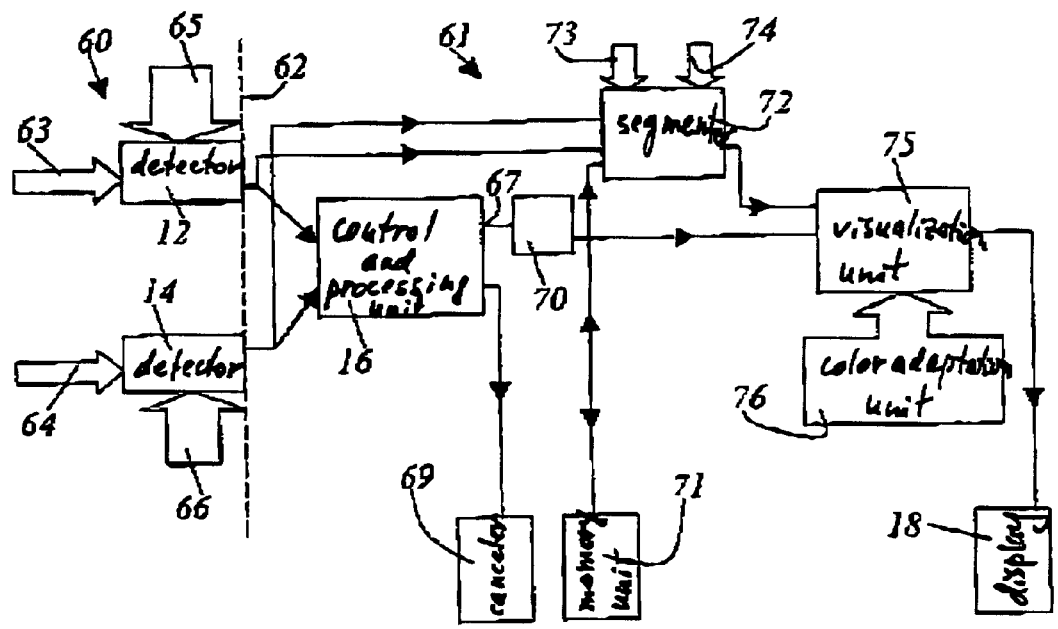
FIG. 6 shows a schematic depiction of the entire system according to the present invention.

FIG. 6 shows a graphic depiction of the entire system. The system is subdivided into two subsystems, separated from one another by a dashed line 62. A first subsystem 60 comprises electronic and optical means (not depicted) used to obtain signals. A second subsystem 61 is implemented in the form of hardware or software. A combination of electronic components with software is also possible.

First subsystem 60 comprises first and second detectors 12 and 14 and their control systems (not explicitly depicted), such as gain and offset, which are necessarily implemented in the unit as hardware. Possibilities for this are, for example, a microscope, cell sorter, spectral camera, etc. First detector 12 receives the fluorescent light of wavelength $\lambda_1$, symbolized by an arrow 63, emitted from the specimen. Second detector 14 receives the fluorescent light of wavelength $\lambda_2$, symbolized by an arrow 64, emitted from the specimen. First and second detectors 12 and 14 also must be calibrated. The parameters are the gain and the zero point of detectors 12 and 14. An arrow 65 depicts the effect of the parameters gain g1 and zero point o1 on first detector 12. An arrow 66 depicts the effect of the parameters gain g2 and zero point o2 on second detector 14. The simplest form of calibration has an input mask (not depicted) on display 18 for the gain (g1, g2) and zero point (o1, o2). Adjustments can be made, for example, with a slider or a panel box (not depicted here).

The signals received by the detectors are forwarded to control and processing unit 16, where the transformation described above is performed. A first output 67 of control and processing unit 16 supplies a signal for angle coordinate 4 of the polar coordinates. Angle coordinate φ is fed to a quantizer 70. From there the quantized signals can be conveyed to a memory unit 71, from which they can also be retrieved at any time. A second output 68 of control and processing unit 16 supplies a signal for local coordinate R of the polar coordinates. Local coordinate R can be fed to a canceler 69, which allows attractive visualization in the case of conventional ratiometric applications. Second stage 61 also comprises a segmenter 72 into which the signals from quantizer 70 and from first and second detectors 12 and 14 are fed. The quantized signals can also be retrieved from memory unit 71. An arrow 73 indicates calibration parameters $r_{min}$ and $r_{ma}$ which represent the influencing variables for segmenter 72. An arrow 74 indicates calibration parameters $I_{min}$ and $I_{max}$ that also represent influencing variables for segmenter 72. Segmenter 72 performs a validation. The corresponding signal is then conveyed to a visualization unit 75. Also acting on visualization unit 75 is a color adaptation unit 76, with which the user can adjust the image on display 18. Visualization unit 75 additionally contains the quantized signals of quantifizer 70. The color information is adapted to the expected measured values. The algorithms implemented in visualization unit 75 are not specified further here. All algorithms benefit from the improved signal dynamics that can be used with control and processing unit 16. For image data, an accumulation technique or filters (for "attractiveness" purposes) could be integrated. For volumetric data (for example in confocal microscopy), a volume renderer can be used.

Figure 7:
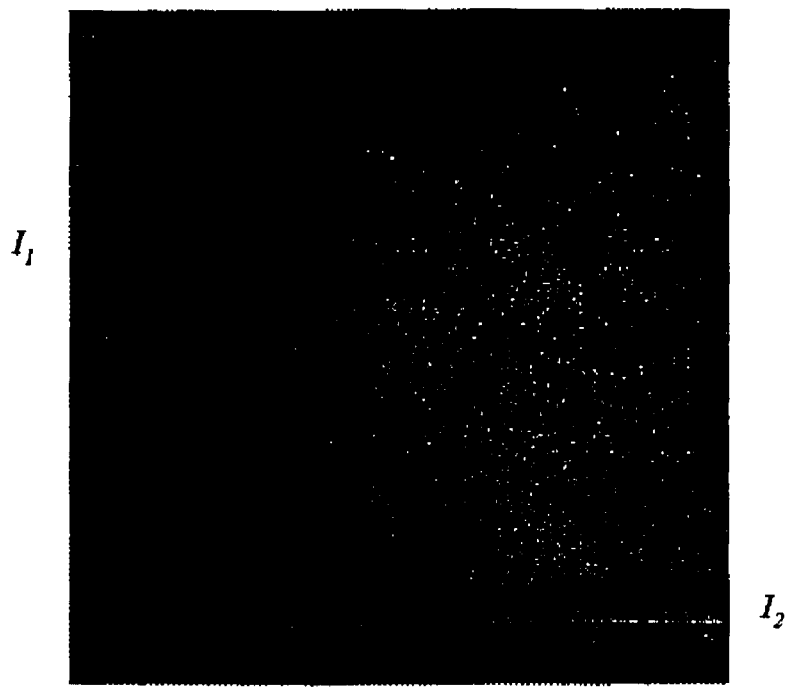
FIG. 7 shows one possible visualization of the segmentation.

FIG. 7 shows one possible presentation of the data on display 18 after segmentation. The segmentation model of itself, however, can be visualized by way of a geometric analogy and presented to the user. This can be done with a presentation as in FIG. 7, similar to a cytofluorogram. First signal $I_1$ is plotted on the ordinate, and second signal $I_2$ on the abscissa. The individual measurement points are depicted as a cloud between the coordinate axes. What is depicted is the $I_1-I_2$ space as in FIG. 3, together with frequency information indicating how often each particular combination of the first and second signals ($I_1$ and $I_2$) occurs in an image. This space can also be used to visualize the segmentation polygon.

Figure 8:
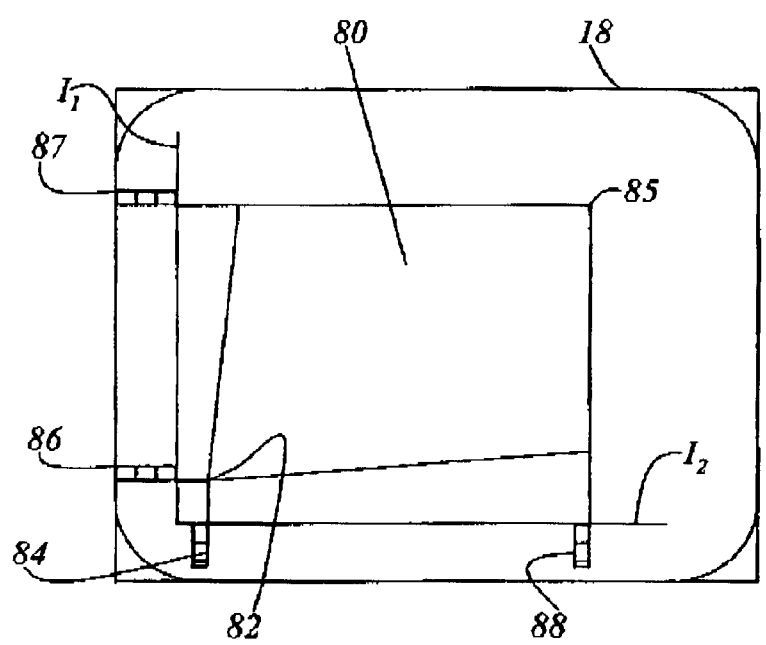
FIG. 8 shows an exemplary embodiment for adjusting the segmentation polygon on the display.

FIG. 8 shows an exemplary embodiment for adjusting a segmentation polygon 80 on display 18. The simplest form of calibration has an input mask for $r_{min}$, $r_{max}I_{min}$, $I_{max}$. The gain and zero point are set by way of the system (generally using a panel box or slider, which is depicted correspondingly on the screen). A corner 82 of segmentation polygon 80 located opposite the coordinate origin can be adjusted using a first slider 84 on the abscissa and a second slider 86 on the ordinate. A third slider 88 on the abscissa and a fourth slider 87 on the ordinate make it possible to adjust the upper limit $I_{1-max}$ of first signal $I_1$ and the upper limit $I_{2-max}$ of second signal $I_2$. All the values can be read off directly from a diagram of this kind. At the same time, it is possible in this fashion to determine the quality of the measurement, which depends on the surface area of polygon 80. In addition, as in the case of a cytofluorogram, the image information can also be presented as a point cloud and the outlines those points lying outside polygon 80 are directly visible. This information can be used accordingly for calibration, which is done by displaying the image and the diagram (FIG. 8) side by side on display 18. The average intensities in this polygon 80 yield the sharp corner of the polygon close to the origin of the coordinate system. The cell of interest could also be defined by a polygon 80 in the image. The averaged intensities inside this polygon correspond to a second point.

Figure 9E:
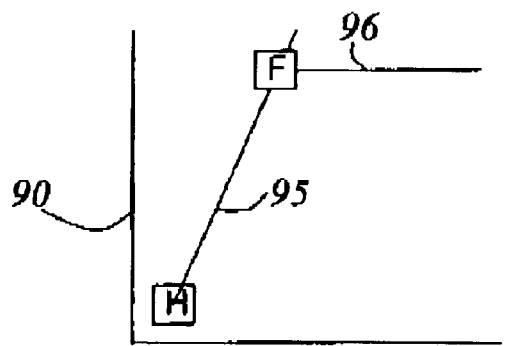

FIGS. 9a through 9h are a graphic depiction of the calibration procedure for determining the polygon. FIG. 9a shows the first step in calibration. In diagram 90, a region H representing the background is defined. A region F represents, for example, the cell being examined or the cell of interest. The polygon can then be constructed sequentially using these two regions (or points) H and F.

As shown in FIG. 9b, images are continuously received and the user adjusts the zero points of first and second detectors 12 and 14 until region H is located in the vicinity of origin 92. Region H (bounded by a dashed line in FIG. 9b) then migrates toward the origin as indicated by arrow 91.

The ion of interest in the specimen is bound by chemical intervention. As FIG. 9c shows, region F migrates as indicated by an arrow 93. Region F is characterized by an increased intensity in diagram 90.

In FIG. 9d, the gain of first detector 12 is adjusted so as to reach almost the end of the detector sensitivity/resolution. Region F moves in the direction of an arrow 94 away from the abscissa of diagram 90.

As is evident from FIG. 9e, from the positions of region H and region F it is already possible to define a first and a second line 95 and 96 of the segmentation polygon. First line 95 connects regions H and F, and second line 96 passes through region F and runs parallel to the abscissa of diagram 90.

Figure 9F:
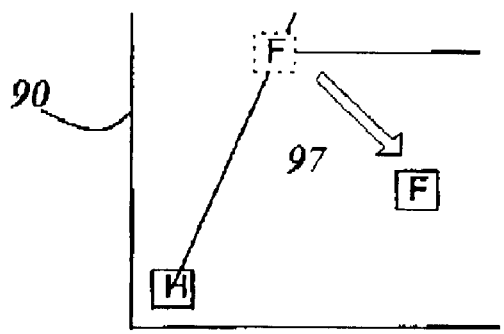

In FIG. 9f the ion of interest is now released by intervention. Region F migrates in the direction of an arrow 97 away from the intersection of first and second lines 95 and 96. The intersection is identified by a dotted box.

Figure 9G:
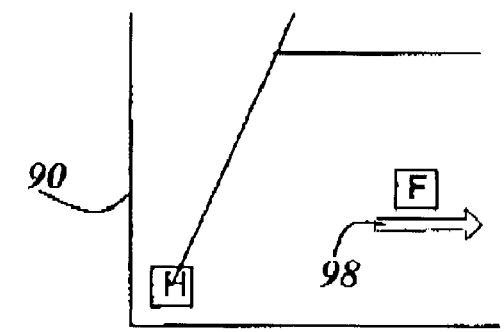

In FIG. 9g, the gain of second detector 14 is adjusted so as to reach almost the end of the detector sensitivity/ resolution. Region F migrates in the direction of an arrow 98 parallel to the abscissa of diagram 90.

Figure 9H:
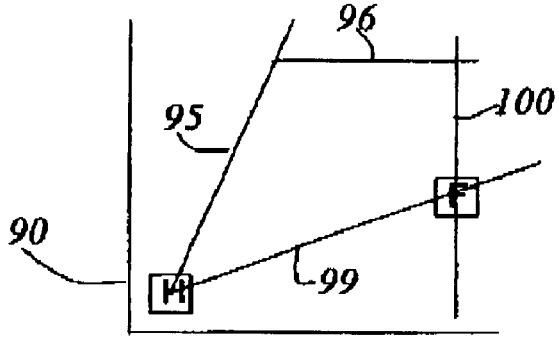

As is evident from FIG. 9h, the final position of region F allows a third and fourth line 99 and 100 to be defined. Third line 99 connects region H and region F. The fourth line passes through region F and is parallel to the ordinate of diagram 90. This algorithm maximizes the surface area of the resulting polygon, can serve as an explanatory component, and encompasses almost all the calibration parameters. These can subsequently be saved and reused when necessary (similar cells, similar environment). The steps described in FIGS. 9b, 9d, 9e, 9g, and 9h can be performed automatically. Each step in itself is relatively simple. The steps described in FIGS. 9d and 9g can be performed either by directly modifying the gain on the panel box or also by dragging region F on display 18.

What is claimed:

1. A method for signal processing, the method comprising the steps of:
    measuring first and second physical values relating to a phenomenon of interest in a confocal microscope, yielding first and second signals indicative thereof, each of the first and second signals containing noise;
    converting the first and second signals into polar coordinates indicative of a vector defined by the magnitudes of the first and second signals, the polar coordinates defining radial magnitude and vector angle relative to a coordinate system; and
    employing upper and lower bounds of the angle information, and upper bounds of the first and second signals, to validate the measured values.

2. The method of claim 1 wherein the vector is defined by the magnitudes of the first and second signals expressed along orthogonal axes.

3. The method of claim 1 wherein the first and second values are measured intensities at differing optical wavelengths, the intensities measured by means of a scanning flourescence microscope.

4. The method of claim 1 wherein the conversion is performed by at least one field programmable gate array.

5. The method of claim 1 wherein the conversion is performed by at least one digital signal processor.

6. The method of claim 1 wherein the conversion is performed by a general microcomputer.

7. The method of claim 1 wherein the conversion is performed with the use of a two lookup table.

8. The method of claim 1 wherein the conversion is performed with the use of a COORDIC algorithm.

9. The method of claim 1 wherein the conversion is performed by means of direct calculation using division, adders and multipliers and lookup tables.

10. The method of claim 1 wherein the conversion is performed by means of approximation via a digital neural network.

11. The method of claim 1 wherein the first and second values are measured intensities at differing optical wavelengths, the intensities indicative of Ca 2+ concentrations.

12. The method of claim 1 wherein the first and second values are measured intensities at differing optical wavelengths, the intensities indicative of pH.

13. The method of claim 1 wherein the first and second values are measured intensities at differing optical wavelengths, the intensities indicative of cAMP.

14. The method of claim 1 wherein the first arid second values are measured intensities at differing optical wavelengths, the intensities measured by means of a cytofluorimeter.

15. A signal processing system comprising:

sensors measuring first and second physical values relating to a phenomenon of interest in a confocal microscope, yielding first and second signals indicative of thereof;

signal processing apparatus receiving the first and second signals and converting the first and second signals into polar coordinates indicative of a vector defined by the magnitudes of the first and second signals.

16. The system of claim 15 wherein the first an second signal are electrical signals.

17. The system of claim 15 wherein the first and second values are measured intensities at differing optical wavelengths, the intensities measured by means of a scanning flourescence microscope.

18. A method for validating measurements of physiological phenomena, the method comprising the steps of:

measuring first and second physical values relating to a phenomenon of interest, yielding first and second signals indicative thereof, each of the first and second signals containing noise;

converting the first and second signals into polar coordinates indicative of a vector defined by the magnitudes of the first and second signals, the polar coordinates defining radial magnitude and vector angle relative to a coordinate system;

applying a first threshold comparator to the first signal, the comparator defining a first in-region signal when the first signal is below a first predetermined threshold;

applying a second threshold comparator to the second signal, the comparator defining a second in-region when the second signal is below a second predetermined threshold;

applying a third threshold comparator to the angle signal, the comparator defining a third in-region signal when the angle signal is below a third predetermined threshold;

applying a fourth threshold comparator to the angle signal, the comparator defining a fourth in-region signal when the first signal is above a predetermined threshold;

annunciating the event of the presence of the first, second, and fourth in-region signals.

19. The method of claim 18 wherein the annunciation is presented to a user in visual form.

* * * * *